(12) United States Patent
Chen (10) Patent No.: US 11,570,810 B2
(45) Date of Patent: Jan. 31, 2023

(54) METHOD AND DEVICE FOR SCHEDULING UPLINK DATA BASED ON CARRIER SENSING OF AT LEAST ONE BEAM

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 209 days.

(21) Appl. No.: 16/994,041

(22) Filed: Aug. 14, 2020

(65) Prior Publication Data

US 2020/0374932 A1    Nov. 26, 2020

Related U.S. Application Data

(63) Continuation of application No. PCT/CN2018/076900, filed on Feb. 14, 2018.

(51) Int. Cl.
*H04W 74/08* (2009.01)
*H04B 7/08* (2006.01)
(Continued)

(52) U.S. Cl.
CPC ...... *H04W 74/0808* (2013.01); *H04B 7/0695* (2013.01); *H04B 7/088* (2013.01); *H04L 5/0055* (2013.01); *H04W 72/042* (2013.01); *H04W 72/046* (2013.01); *H04W 72/10* (2013.01); *H04W 72/1247* (2013.01); *H04W 72/1257* (2013.01); *H04W 72/1268* (2013.01); *H04W 72/1289* (2013.01); *H04W 72/14* (2013.01)

(58) Field of Classification Search
CPC .......... H04W 74/0808; H04W 72/042; H04W 72/046; H04W 72/10; H04W 72/12; H04W 72/47; H04W 72/1257; H04W 72/1268; H04W 72/1289; H04W 72/14; H04B 7/0695; H04B 7/088; H04L 5/0055
See application file for complete search history.

(56) References Cited

U.S. PATENT DOCUMENTS

| | | | |
|---|---|---|---|
| 8,355,387 | B2 | 1/2013 | Qin |
| 2010/0020770 | A1 | 1/2010 | Qin |

(Continued)

FOREIGN PATENT DOCUMENTS

| | | |
|---|---|---|
| CN | 106658751 A | 5/2017 |
| WO | 2017020293 A1 | 2/2017 |

OTHER PUBLICATIONS

International Search Report in the international application No. PCT/CN2018/076900, dated Oct. 24, 2018.

(Continued)

*Primary Examiner* — Joshua Kading (57) ABSTRACT

An uplink data scheduling method and device are provided. The method comprises: a terminal device receiving a first signalling sent by a network device, wherein the first signalling comprises beam information of M beams, and M is a positive integer; the terminal device carrying out carrier sensing on the M beams in sequence according to the first signalling; and the terminal device selecting, according to the sensing result, one beam of the M beams to transmit an uplink channel to the network device.

11 Claims, 3 Drawing Sheets

(51) Int. Cl.
  *H04W 72/04*   (2009.01)
  *H04W 72/10*   (2009.01)
  *H04W 72/12*   (2009.01)
  *H04W 72/14*   (2009.01)
  *H04L 5/00*    (2006.01)
  *H04B 7/06*    (2006.01)

(56) References Cited

U.S. PATENT DOCUMENTS

| | | | |
|---|---|---|---|
| 2016/0087765 A1* | 3/2016 | Guey | H04B 7/0617 370/330 |
| 2016/0119958 A1* | 4/2016 | Tan | H04W 74/006 370/336 |
| 2017/0012692 A1* | 1/2017 | Kim | H04B 7/0695 |
| 2017/0171887 A1 | 6/2017 | Shi et al. | |
| 2017/0187437 A1* | 6/2017 | Cariou | H04B 7/0417 |
| 2018/0184463 A1* | 6/2018 | Fakoorian | H04W 74/0808 |
| 2018/0332579 A1* | 11/2018 | Kang | H04L 5/14 |
| 2019/0215140 A1* | 7/2019 | Hafeez | H04W 74/0808 |
| 2020/0236555 A1* | 7/2020 | Tomeba | H04W 16/14 |
| 2021/0083725 A1* | 3/2021 | Miao | H04B 7/0413 |

OTHER PUBLICATIONS

Supplementary European Search Report in the European application No. 18906404.1, dated Apr. 4, 2022.

* cited by examiner

METHOD AND DEVICE FOR SCHEDULING UPLINK DATA BASED ON CARRIER SENSING OF AT LEAST ONE BEAM

CROSS-REFERENCE TO RELATED APPLICATION

This is a continuation application of International Patent Application No. PCT/CN2018/076900, filed on Feb. 14, 2018, entitled "Uplink Data Scheduling Method and Device", the disclosure of which is hereby incorporated by reference in its entirety.

BACKGROUND

A 5th-Generation (5G) system supports data transmission on an unlicensed frequency band. After a network device sends scheduling grant information to a terminal device, the terminal device may perform carrier sensing based on the scheduling grant information. If an idle channel is sensed in a certain beam direction, the terminal device uses the beam to send a UL channel. If there is no idle channel in the beam direction, the terminal device delays sending the UL channel. Therefore, how to reduce a transmission delay of a UL channel becomes a problem urgent to be solved.

SUMMARY

Embodiments of the disclosure relate to the field of communication, and more particularly to a method and device for scheduling Uplink (UL) data.

In a first aspect, there is provided a method for scheduling UL data, which includes that: a terminal device receives first signaling sent by a network device, the first signaling including beam information of M beams and M being a positive integer; the terminal device performs carrier sensing on the M beams according to the first signaling; and the terminal device selects one of the M beams according to a sensing result to send a UL channel to the network device.

Accordingly, the network device configures a plurality of candidate beams configured to send the UL channel for the terminal device. The terminal device performs carrier sensing on the plurality of candidate beams in sequence, and selects a proper beam based on the sensing result to send the UL channel, so that a transmission delay of the UL channel on an unlicensed frequency band may be greatly reduced.

In a possible implementation, the beam information may be an index of Sounding Reference Signal (SRS) resources.

In a possible implementation, the UL channel may be a Physical Uplink Shared Channel (PUSCH) or a Physical Uplink Control Channel (PUCCH).

In a possible implementation, the operation that the terminal device performs carrier sensing on the M beams according to the first signaling may include that: the terminal device performs carrier sensing on the M beams in sequence according to the first signaling until it is sensed on an Nth beam that a channel is idle, N being a positive integer less than or equal to M.

The operation that the terminal device selects one of the M beams according to the sensing result to send the UL channel to the network device may include that: the terminal device sends the UL channel to the network device through the Nth beam.

In a possible implementation, the operation that the terminal device performs carrier sensing on the M beams in sequence according to the first signaling may include that: the terminal device performs, according to priorities of the M beams, carrier sensing on the M beams one by one in a sequence from high to low priorities.

In a possible implementation, N beams which include the Nth beam and on which carrier sensing is performed may correspond to N sensing windows one to one, and a sensing window used by the terminal device to perform carrier sensing on each beam of the N beams may be the sensing window corresponding to the beam.

In a possible implementation, the N sensing windows may be N successive sensing windows.

In a possible implementation, before the operation that the terminal device performs carrier sensing on the M beams one by one, the method may further include that: the terminal device receives first indication information sent by the network device, the first indication information being configured to indicate information of each sensing window; or the terminal device acquires the information, pre-stored in the terminal device, of each sensing window.

In a possible implementation, the information of each sensing window may include a time length of the sensing window and/or a starting time position of the sensing window.

In a possible implementation, the UL channel may be the PUSCH, and the first signaling may further include information of a first time length, the first time length being a time length between a slot, a starting time-domain symbol or an ending time-domain symbol where a Physical Downlink Control Channel (PDCCH) sent to the terminal device by the network device is located and a starting time point of a first sensing window, and the first sensing window being a sensing window which corresponds to a beam sensed firstly of the N beams.

In a possible implementation, the UL channel may be the PUSCH, and the first signaling may further include information of a second time length, the second time length being a time length between a slot or an ending time-domain symbol where the PUSCH sent to the network device by the terminal device is located and a slot or a starting time-domain symbol where a downlink feedback channel is located, and the downlink feedback channel being configured for the terminal device to send feedback response information for the PUSCH to the network device.

In a possible implementation, the operation that the terminal device performs carrier sensing on all or part of beams of the M beams according to the first signaling may include that: the terminal device performs carrier sensing on the M beams simultaneously.

The operation that the terminal device selects one of the all or part of beams according to the sensing result to send the UL channel to the network device may include that: the terminal device sends the UL channel to the network device through a beam on which a channel is sensed to be idle.

In a possible implementation, before the operation that the terminal device receives the scheduling grant information sent by the network device, the method may further include that: the terminal device receives second indication information sent by the network device, the second indication information being configured to indicate a value of M; or the terminal device acquires the value of M which is pre-stored in the terminal device.

In a second aspect, there is provided a method for scheduling UL data, which includes that: a network device sends first signaling to a terminal device, the first signaling including beam information of M beams and M being a positive integer; and the network device receives a UL channel which is sent by the terminal device through one of the M beams.

Accordingly, the network device configures a plurality of candidate beams configured to send the UL channel for the terminal device. The terminal device performs carrier sensing on the plurality of candidate beams in sequence, and selects a proper beam based on a sensing result to send the UL channel, so that a transmission delay of the UL channel on an unlicensed frequency band may be greatly reduced.

In a possible implementation, the beam information may be an index of SRS resources.

In a possible implementation, the UL channel may be a PUSCH or a PUCCH.

In a possible implementation, the operation that the network device receives the UL channel which is sent by the terminal device through one of the M beams may include that: the network device receives the UL channel which is sent by the terminal device through an Nth beam of the M beams, the Nth beam being a beam on which the terminal device senses that a channel is idle when performing carrier sensing on the M beams in sequence, and N being a positive integer less than or equal to M.

In a possible implementation, N beams which include the Nth beam and on which carrier sensing is performed may correspond to N sensing windows one to one, and a sensing window used by the terminal device to perform carrier sensing on each beam of the N beams may be the sensing window corresponding to the beam.

In a possible implementation, the N sensing windows may be N successive sensing windows.

In a possible implementation, the method may further include that: the network device sends first indication information to the terminal device, the first indication information being configured to indicate information of each sensing window.

In a possible implementation, the information of each sensing window may include a time length of the sensing window and/or a starting time position of the sensing window.

In a possible implementation, the UL channel may be the PUSCH, and the first signaling may further include information of a first time length, the first time length being a time length between a slot, a starting time-domain symbol or an ending time-domain symbol where a PDCCH sent to the terminal device by the network device is located and a starting time point of a first sensing window, and the first sensing window being a sensing window which corresponds to a beam sensed firstly of the N beams.

In a possible implementation, the UL channel may be the PUSCH, and the first signaling may further include information of a second time length, the second time length being a time length between a slot or an ending time-domain symbol where the PUSCH sent to the network device by the terminal device is located and a slot or a starting time-domain symbol where a downlink feedback channel is located, and the downlink feedback channel being configured for the terminal device to send feedback response information for the PUSCH to the network device.

In a possible implementation, the operation that the network device receives the UL channel which is sent by the terminal device through one of the M beams may include that: the network device receives the UL channel sent by the terminal device through a beam, on which a channel is sensed to be idle, of the M beams, the terminal device simultaneously performing carrier sensing on the M beams.

In a possible implementation, before the network device sends scheduling grant information to the terminal device, the method may further include that: the network device sends second indication information to the terminal device, the second indication information being configured to indicate a value of M.

In a third aspect, there is provided a terminal device, which may execute the operations of the terminal device in the first aspect or any optional implementation of the first aspect. Specifically, the terminal device may include modular units which are configured to execute the operations of the terminal device in the first aspect or any possible implementation of the first aspect.

In a fourth aspect, there is provided a network device, which may execute operations of the network device in the second aspect or any optional implementation of the second aspect. Specifically, the network device may include modular units which are configured to execute the operations of the network device in the second aspect or any possible implementation of the second aspect.

In a fifth aspect, there is provided a terminal device, which includes a processor, a transceiver and a memory. The processor, the transceiver and the memory communicate with one another through an internal connection path. The memory is configured to store instructions, and the processor is configured to execute the instructions stored in the memory. When the processor executes the instructions stored in the memory, such execution enables the terminal device to execute the method in the first aspect or any possible implementation of the first aspect, or such execution enables the terminal device to implement the terminal device provided in the third aspect.

In a sixth aspect, there is provided a network device, which includes a processor, a transceiver and a memory. The processor, the transceiver and the memory communicate with one another through an internal connection path. The memory is configured to store instructions, and the processor is configured to execute the instructions stored in the memory. When the processor executes the instructions stored in the memory, such execution enables the network device to execute the method in the second aspect or any possible implementation of the second aspect, or such execution enables the network device to implement the network device provided in the fourth aspect.

In a seventh aspect, there is provided a system chip, which includes an input interface, an output interface, a processor and a memory. The processor is configured to execute instructions stored in the memory. When the instructions are executed, the processor may implement the method in the first aspect or any possible implementation of the first aspect.

In an eighth aspect, there is provided a system chip, which includes an input interface, an output interface, a processor and a memory. The processor is configured to execute instructions stored in the memory. When the instructions are executed, the processor may implement the method in the second aspect or any possible implementation of the second aspect.

In a ninth aspect, there is provided a computer program product including instructions, which runs on a computer to enable the computer to execute the method in the first aspect or any possible implementation of the first aspect.

In a tenth aspect, there is provided a computer program product including instructions, which runs on a computer to enable the computer to execute the method in the second aspect or any possible implementation of the second aspect.

DETAILED DESCRIPTION

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
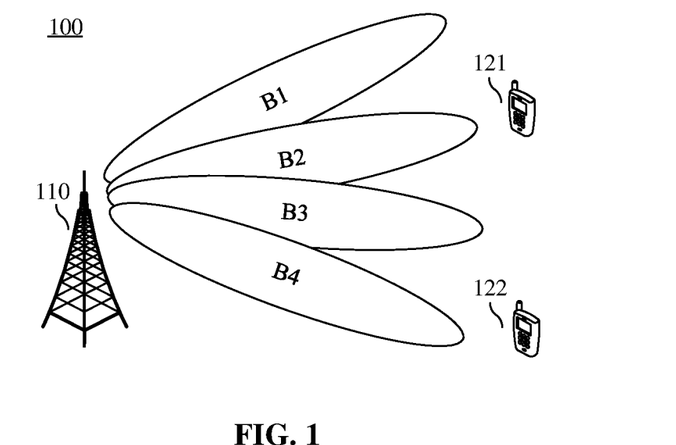
FIG. 1 is a schematic diagram of a wireless communication system to which the embodiments of the disclosure are applied.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage region. Optionally, the network device 110 may be a Base Transceiver Station (BTS) in the GSM or the CDMA system, or may be a NodeB (NB) in the WCDMA system, or may further be an Evolutional Node B (eNB or eNodeB) in the LTE system or a wireless controller in a Cloud Radio Access Network (CRAN). Or the network device may be a relay station, an access point, a vehicle device, a wearable device, a network-side device in a future 5G network, or a network device in a future evolved Public Land Mobile Network (PLMN) or the like.

The wireless communication system 100 further includes at least one terminal device, for example, a terminal device 121 and a terminal device 122, within the coverage of the network device 110. The terminal device 121 and the terminal device 122 may be mobile or fixed. Optionally, the terminal device 121 or the terminal device 122 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle device, a wearable device, a terminal device in the future 5G network, a terminal device in the future evolved PLMN or the like. Optionally, the terminal device 121 may also perform Device to Device (D2D) communication with the terminal device 122.

One network device and two terminal devices are exemplarily illustrated in FIG. 1. Optionally, the wireless communication system 100 may include a plurality of network devices, and another number of terminal devices may be included in coverage range of each network device. There are no limits made thereto in the embodiments of the disclosure.

Optionally, the wireless communication system 100 may further include another network entity such as a network controller and a mobility management entity. There are no limits made thereto in the embodiments of the disclosure.

Since a frequency band for data transmission in a 5G system is higher than a frequency band for LTE, path loss for wireless signal transmission increases and coverage of a wireless signal is reduced. Therefore, a beamforming technology is proposed for the 5G system to increase a gain of the wireless signal, thereby compensating the path loss. Specifically, a beam adopted by a base station to send a signal to a terminal device is directional. Different beams practically correspond to different transmitting directions. Each narrow beam may only cover part of regions of a cell, but may not cover all regions of the cell. For example, as illustrated in FIG. 1, FIG. 1 illustrates four beams in different directions, i.e., a beam B1, a beam B2, a beam B3 and a beam B4. The base station may send signals to the terminal device through the four beams in different directions. The beam B1 and the beam B2 can only cover the terminal device 121, but cannot cover the terminal device 122. The beam B3 and the beam B4 can only cover the terminal device 122, but cannot cover the terminal device 121. The base station may send signals to the terminal device 121 through the beam B1 and the beam B2 and send signals to the terminal device 122 through the beam B3 and the beam B4.

In addition, the 5G system also supports data transmission on unlicensed frequency bands. Data transmission on an unlicensed frequency band is based on a Listen Before Talk (LBT) mechanism. For a communication system working on an unlicensed frequency band, a sending node, before sending a signal, needs to determine whether a channel is idle in an LBT manner and, after determining that the channel is idle, may send the signal.

For an LTE system, a base station, after sensing in a downlink slot that a channel is idle, sends a UL grant to a terminal device through the idle channel. The terminal device also performs sensing after receiving the UL grant. If the channel is sensed to be idle, the terminal device sends UL data through the idle channel.

In the 5G system, a link with an optimal measurement result may be acquired for data transmission between the terminal device and the base station through a sending and measurement process of a reference signal such as a Channel State Information Reference Signal (CSI-RS), an SRS and a Synchronizing Signal Block (SSB).

The terminal device performs carrier sensing (or called beam sensing, channel sensing, sensing and the like) on one determined beam. If it is detected that a channel on the beam is busy before the data is sent, the UL data cannot be sent. In such case, the terminal device may lose a scheduling opportunity, and transmission of the UL data may be delayed.

For reducing a transmission delay of a UL channel on an unlicensed frequency band, it is proposed in the embodiments of the disclosure that a network device may configure a plurality of candidate beams configured to send the UL channel for a terminal device. The terminal device performs carrier sensing on the plurality of candidate beams in sequence, and selects a proper beam based on a sensing result to send the UL channel, so that the transmission delay of the UL channel on the unlicensed frequency band is greatly reduced.

Figure 2:
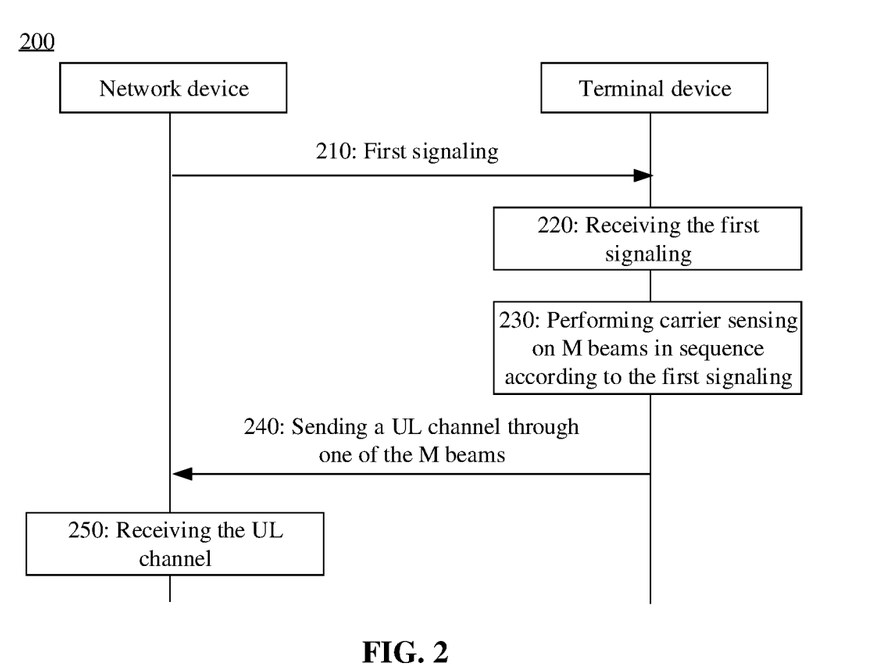
FIG. 2 is an interaction flowchart of a method for scheduling UL data according to an embodiment of the disclosure.

FIG. 2 is an interaction flowchart of a method for scheduling UL data according to an embodiment of the disclosure. A network device illustrated in FIG. 2 may be, for example, the network device 110 illustrated in FIG. 1. A terminal device illustrated in FIG. 2 may be, for example, the terminal device 121 or terminal device 122 illustrated in FIG. 1. The method illustrated in FIG. 2 may be applied to an unlicensed frequency band. As illustrated in FIG. 2, the method for scheduling UL data may include part or all of the following operations.

In block 210, the network device sends first signaling to the terminal device.

In block 220, the terminal device receives the first signaling sent by the network device.

The first signaling includes beam information of M beams, M being a positive integer.

The first signaling may be, for example, a PDCCH or Radio Resource Control (RRC) signaling.

Optionally, the beam information of each beam included in the first signaling is an index of SRS resources.

Optionally, before the operation in block 220, the terminal device needs to acquire a value of M. For example, the terminal device may receive second indication information sent by the network device, the second indication information being configured to indicate the value of M; or the terminal device acquires the value of M which is pre-stored in the terminal device.

That is, the value of M may be configured for the terminal device by the network device. Or the value of M may be predetermined by the terminal device and the network device, and be pre-stored in the terminal device, for example, a value predetermined in a protocol.

In block 230, the terminal device performs carrier sensing on all or part of beams of the M beams according to the first signaling.

Optionally, the terminal device may sequentially perform carrier sensing on the M beams according to the first signaling; or the terminal device may simultaneously perform carrier sensing on the M beams. Specific descriptions will be made later.

Optionally, the operation in block 230 that carrier sensing is performed on all or part of beams of the M beams may be that directional carrier sensing is performed on all or part of beams of the M beams. For example, for a certain beam, carrier sensing may be performed in a first sensing direction of the beam, and/or carrier sensing may be performed in a second sensing direction of the beam. The first sensing direction is, for example, a direction where data is sent to the network device through the beam, and the second sensing direction is, for example, an opposite direction of the first sensing direction.

In block 240, the terminal device selects one of the all or part of beams according to a sensing result to send a UL channel to the network device.

In block 250, the network device receives the UL channel which is sent by the terminal device through one of the M beams.

For example, the terminal device selects one beam from the M beams according to channel states (busy or idle) sensed on different beams and sends the UL channel to the network device through the beam, and the network device receives the UL channel sent by the terminal device through the beam.

It is to be understood that, in the embodiment of the disclosure, a beam for receiving a signal may be understood as a spatial domain reception filter for receiving the signal, and a beam for sending a signal may be understood as a spatial domain transmission filter for sending the signal. Two signals being sent by use of the same spatial domain transmission filter may be referred to as the two signals being Quasi-Co-Located (QCL) relative to a spatial reception parameter.

Optionally, the UL channel is a PUSCH or a PUCCH.

In block 230, the terminal device may perform carrier sensing on all or part of beams of the M beams specifically in the following two manners, which may be described below respectively.

A First Manner

Optionally, the operation in block 230 that the terminal device performs carrier sensing on all or part of the M beams according to the first signaling includes that: the terminal device performs carrier sensing on the M beams in sequence according to the first signaling until it is sensed in on Nth beam that a channel is idle.

N is a positive integer less than or equal to M.

When the terminal device performs carrier sensing on the M beams in sequence, for example, carrier sensing may be performed, according to priorities of the M beams, on the M beams one by one in a sequence from high to low priorities.

For example, the priorities of the M beams may be determined by the network device according to a signal measurement result (for example, signal quality of a reference signal or reference signal received power) of each beam. There are no limits made herein.

Correspondingly, the operation in block 240 that the terminal device selects one of the M beams according to the sensing result to send the UL channel to the network device includes that: the terminal device sends the UL channel to the network device through the Nth beam.

Correspondingly, the operation in block 250 that the network device receives the UL channel which is sent by the terminal device through one of the M beams includes that: the network device receives the UL channel which is sent by the terminal device through the Nth beam of the M beams, the Nth beam being a beam on which the terminal device senses that the channel is idle when performing carrier sensing on the M beams in sequence, and N being a positive integer less than or equal to M.

For example, the terminal device starts performing carrier sensing from the first beam. The terminal device does not sense any idle channel during sensing for the first beam to the (N−1)th beam, that is, the channels are occupied. The terminal device senses on the Nth beam that the channel is idle. In such case, the terminal device may stop sensing the remaining beams and send the UL channel through the Nth beam.

That the terminal device senses on the Nth beam that the channel is idle may refer to that, for example, power of a reference signal sent on the beam is less than a preset threshold value and then it is determined that the channel on the beam is idle.

For example, there is made such a hypothesis that M=4, the four candidate beams are a beam B1, a beam B2, a beam B3 and a beam B4 respectively, and a priority sequence is beam B1>beam B2>beam B3>beam B4. In such case, the terminal device performs carrier sensing on the beam B1 at first. If there is no idle channel on the beam B1, the terminal device continues performing carrier sensing on the beam B2. If it is sensed on the beam B2 that a channel is idle, the terminal device stops sensing and sends the UL channel to the network device through the beam B2. If no idle channel is sensed on the beam B2, the terminal device continues performing carrier sensing on the beam B3. If it is sensed on the beam B3 that a channel is idle, the terminal device stops sensing and sends the UL channel to the network device through the beam B3. If no idle channel is sensed on the beam B3, the terminal device continues performing carrier sensing on the beam B4. If it is sensed on the beam B4 that a channel is idle, the terminal device sends the UL channel to the network device through the beam B4. If no idle channel is sensed on the beam B4, the terminal device may delay sending the UL channel.

Optionally, N beams including the Nth beam and having been sensed correspond to N sensing windows one to one, and a sensing window used by the terminal device to perform carrier sensing on each beam of the N beams is the sensing window corresponding to the beam.

The terminal device, when sensing the N beams, performs sensing in different sensing windows respectively. When sensing each beam, sensing is performed in the sensing window corresponding to the beam.

Optionally, the N sensing windows corresponding to the N beams may be equal or unequal in length.

Optionally, the N sensing windows corresponding to the N beams are temporally successively distributed.

For example, there is made such a hypothesis that N=3, the terminal device senses that a channel is idle when sensing the third beam, i.e., the beam B3, the three sensed beams are the beam B1, the beam B2 and the beam B3 respectively, and a priority sequence is beam B1>beam B2>beam B3. The sensing window corresponding to the beam B1 is W1, the sensing window corresponding to the beam B2 is W2, and the sensing window corresponding to the beam B3 is W3. The three sensing windows are sequentially arranged to be W1, W2 and W3 according to a time sequence. Correspondingly, the terminal device sequentially performs sensing on the beam B1 in W1, on the beam B2 in W2, and on the beam B3 in W3 respectively.

Optionally, before the operation in block 220 that the terminal device performs directional carrier sensing on the M beams in sequence, the method further includes that: the terminal device receives first indication information sent by the network device, the first indication information being configured to indicate information of each sensing window; or the terminal device acquires the information, pre-stored in the terminal device, of each sensing window.

Optionally, the information of each sensing window includes a time length of the sensing window and/or a starting time position of the sensing window.

That is, the length and/or starting time position of each sensing window may be configured for the terminal device by the network device. Or the length and/or starting time position of each sensing window are predetermined by the terminal device and the network device and pre-stored in the terminal device. For example, the length and/or starting time position of the sensing window are/is predetermined in the protocol.

Optionally, the first signaling further includes information of a first time length and/or a second time length.

The first time length is a time length between a slot, a starting time-domain symbol or an ending time-domain symbol where a PDCCH sent to the terminal device by the network device is located and a starting time point of a first sensing window, and the first sensing window is a sensing window which corresponds to a beam sensed firstly of the N beams.

The second time length is a time length between a slot or an ending time-domain symbol where the PUSCH sent to the network device by the terminal device is located and a slot or a starting time-domain symbol where a downlink feedback channel is located, and the downlink feedback channel is configured for the terminal device to send feedback response information for the PUSCH to the network device.

The first time length and the second time length will be described below with FIG. 3 and FIG. 4 as examples.

Figure 3:
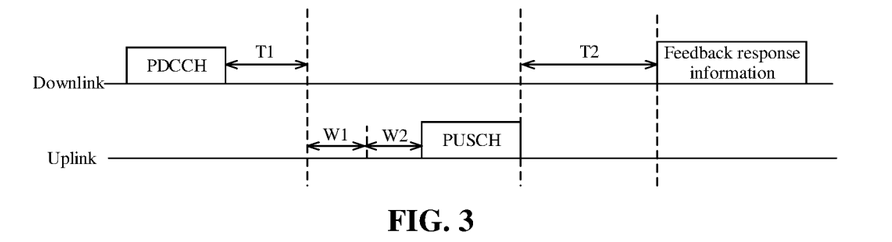
FIG. 3 is a schematic diagram of a first time length and a second time length according to an embodiment of the disclosure.

As illustrated in FIG. 3, there is made such a hypothesis that N=2 and the terminal device senses that a channel is idle when sensing the second beam. The two sensed beams are the beam B1 and the beam B2 respectively. The sensing window corresponding to the beam B1 is W1, and the sensing window corresponding to the beam B2 is W2. A time interval between the PDCCH sent to the terminal device by the network device and the sensing window W1 is equal to the first time length T1. The terminal device starts carrier sensing after receiving the PDCCH for the time length T1. The beam B1 is sensed in W1 at first, and no idle channel is sensed. Then the beam B2 is sensed in W2, and the idle channel is sensed. Therefore, the terminal device sends the PUSCH to the network device through the beam B2. After receiving the PUSCH which is sent by the terminal device through the beam B2, the network device sends a feedback response message, for example, an ACKnowledgement (ACK) or Negative ACK (NACK) message, for the PUSCH to the terminal device after the time length T2.

Figure 4:
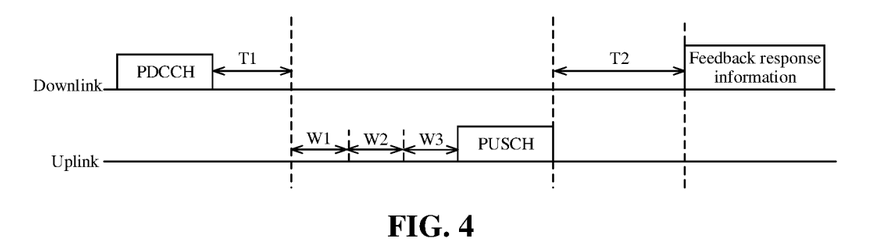
FIG. 4 is a schematic diagram of a first time length and a second time length according to an embodiment of the disclosure.

As illustrated in FIG. 4, there is made such a hypothesis that N=3 and the terminal device senses that a channel is idle when sensing the third beam. The three sensed beams are the beam B1, the beam B2 and the beam B3 respectively. The sensing window corresponding to the beam B1 is W1, the sensing window corresponding to the beam B2 is W2, and the sensing window corresponding to the beam B3 is W3. A time interval between the PDCCH sent to the terminal device by the network device and the sensing window W1 is equal to the first time length T1. The terminal device starts carrier sensing after receiving the PDCCH for the time length T1. The beam B1 is sensed in W1 at first, and no idle channel is sensed. Then the beam B2 is sensed in W2, and no idle channel is sensed. Next, the beam B3 is sensed in W3, and the idle channel is sensed. Therefore, the terminal device sends the PUSCH to the network device through the beam B3. After receiving the PUSCH which is sent by the terminal device through the beam B3, the network device sends a feedback response message, for example, an ACK or NACK message, for the PUSCH to the terminal device after the time length T2.

Figure 5:
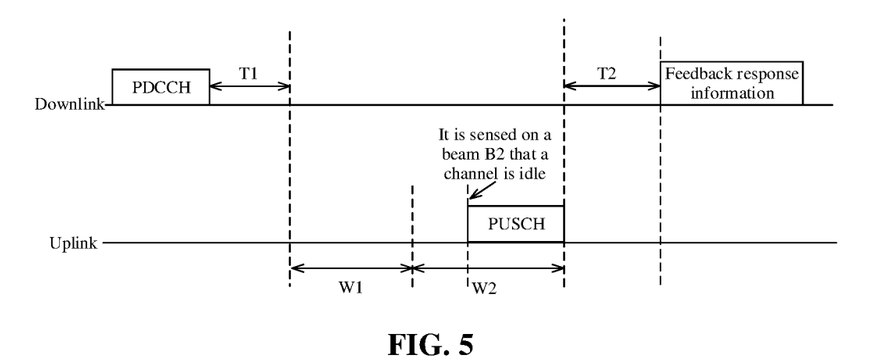
FIG. 5 is a schematic diagram of a first time length and a second time length according to an embodiment of the disclosure.

Optionally, the terminal device, after sensing that a channel is idle in the sensing window corresponding to a certain beam, may immediately send the UL channel That is, the UL channel may be sent in remaining time of the sensing window.

For example, as illustrated in FIG. 5, the terminal device senses the beam B1 in the sensing window W1 and finds that the channel is occupied. Then the terminal device senses the beam B2 in the sensing window W2 and senses that the channel on the beam B2 is idle at a certain time point in W2. In such case, the remaining time in W2 may be configured to transmit the PUSCH.

In such a manner, by configuring a larger sensing window, the network device may ensure that both carrier sensing and data sending of the terminal device are completed in one sensing window. Therefore, for a sensing window, the network device only needs to use one receiving beam to receive UL data that may be sent by the terminal device.

On the contrary, if the time length of the sensing window is set to be shorter, the terminal device, after sensing that the channel is idle, needs to send the UL channel outside the sensing window, then the network device may not be able to determine the specific beam on which the terminal device senses that the channel is idle. Therefore, it is necessary to simultaneously receive the UL data that may be sent by the terminal device, in a plurality of possible beam directions. In such case, the network device has a capability of simultaneously receiving UL signals in a plurality of beam directions.

A Second Manner

Optionally, the operation in block 230 that the terminal device performs carrier sensing on all or part of beams of the M beams according to the first signaling includes that: the terminal device simultaneously performs carrier sensing on the M beams.

For example, the terminal device simultaneously turns on a plurality of or all receiving panels for carrier sensing.

Correspondingly, the operation in block 240 that the terminal device selects one of the all or part of beams according to the sensing result to send the UL channel to the network device includes that: the terminal device sends the UL channel to the network device through a beam on which a channel is sensed to be idle.

Correspondingly, the operation in block 250 that the network device receives the UL channel which is sent by the terminal device through one of the M beams includes that: the network device receives the UL channel which is sent by the terminal device through a beam on which a channel is sensed to be idle of the M beams, the terminal device simultaneously performing carrier sensing on the M beams.

Accordingly, in the embodiment of the disclosure, the network device configures a plurality of candidate beams, which are configured to send the UL channel, for the terminal device, and the terminal device sequentially performs carrier sensing on the plurality of candidate beams and selects a proper beam based on a sensing result to send the UL channel, so that a transmission delay of the UL channel on an unlicensed frequency band may be greatly reduced.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

The method for scheduling UL data according to the embodiments of the disclosure is described above in detail, and a device according to the embodiments of the disclosure will be described below in combination with FIG. 6 to FIG. 9. The technical characteristics described in the method embodiments are applied to the following device embodiments.

Figure 6:
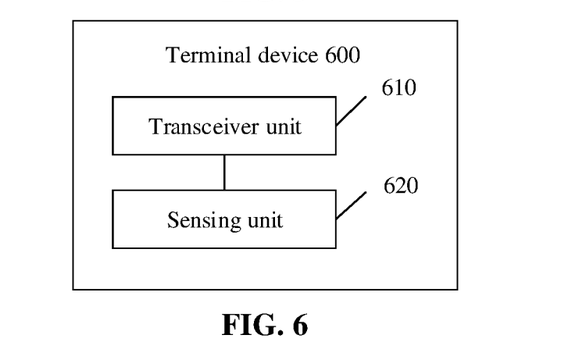
FIG. 6 is a schematic block diagram of a terminal device according to an embodiment of the disclosure.

FIG. 6 is a schematic block diagram of a terminal device 600 according to an embodiment of the disclosure. As illustrated in FIG. 6, the terminal device 600 includes a transceiver unit 610 and a sensing unit 620.

The transceiver unit 610 is configured to receive first signaling sent by a network device, the first signaling including beam information of M beams, M being a positive integer.

The sensing unit 620 is configured to perform carrier sensing on the M beams in sequence according to the first signaling.

The transceiver unit 610 is further configured to select one of the M beams according to a sensing result to send a UL channel to the network device.

Accordingly, the network device configures a plurality of candidate beams, which are configured to send the UL channel, for the terminal device, and the terminal device performs carrier sensing on the plurality of candidate beams in sequence and selects a proper beam based on the sensing result to send the UL channel, so that a transmission delay of the UL channel on an unlicensed frequency band may be greatly reduced.

Optionally, the beam information is an index of SRS resources.

Optionally, the UL channel is a PUSCH or a PUCCH.

Optionally, the sensing unit 620 is specifically configured to perform carrier sensing on the M beams in sequence according to the first signaling until it is sensed on an Nth beam that a channel is idle, N being a positive integer less than or equal to M.

The transceiver unit 610 is specifically configured to send the UL channel to the network device through the Nth beam.

Optionally, the sensing unit 620 is specifically configured to perform, according to priorities of the M beams, carrier sensing on the M beams one by one in a sequence from high to low priorities.

Optionally, N beams which include the Nth beam and on which carrier sensing is performed correspond to N sensing windows one to one, and a sensing window used by the terminal device to perform carrier sensing on each beam of the N beams is the sensing window corresponding to the beam.

Optionally, the N sensing windows are N successive sensing windows.

Optionally, the sensing unit 620 is further configured to receive first indication information sent by the network device through the transceiver unit 610, the first indication information being configured to indicate information of each sensing window, or acquire the information, pre-stored in the terminal device, of each sensing window.

Optionally, the information of each sensing window includes a time length of the sensing window and/or a starting time position of the sensing window.

Optionally, the UL channel is the PUSCH, and the first signaling further includes information of a first time length, the first time length being a time length between a slot, a starting time-domain symbol or an ending time-domain symbol where a PDCCH sent to the terminal device by the network device is located and a starting time point of a first sensing window, and the first sensing window being a sensing window which corresponds to a beam sensed firstly of the N beams.

Optionally, the UL channel is the PUSCH, and the first signaling further includes information of a second time length, the second time length being a time length between a slot or an ending time-domain symbol where the PUSCH sent to the network device by the terminal device is located and a slot or a starting time-domain symbol where a downlink feedback channel is located, and the downlink feedback channel being configured for the terminal device to send feedback response information for the PUSCH to the network device.

The sensing unit 620 is specifically configured to simultaneously perform carrier sensing on the M beams.

The transceiver unit 610 is specifically configured for the terminal device to send the UL channel to the network device through a beam on which a channel is sensed to be idle.

Optionally, the sensing unit 620 is further configured to receive second indication information sent by the network device through the transceiver unit 610, the second indication information being configured to indicate a value of M, or acquire the value of M which is pre-stored in the terminal device.

It is to be understood that the terminal device 600 may execute corresponding operations executed by the terminal device in the method 200 and, for simplicity, will not be elaborated herein.

Figure 7:
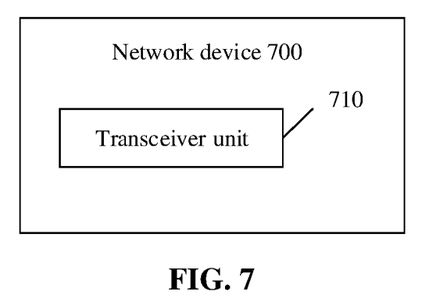
FIG. 7 is a schematic block diagram of a network device according to an embodiment of the disclosure.

FIG. 7 is a schematic block diagram of a network device 700 according to an embodiment of the disclosure. As illustrated in FIG. 7, the network device 700 includes a transceiver unit 710, and the transceiver unit 710 is configured to:

send first signaling to a terminal device, the first signaling including beam information of M beams and M being a positive integer, and receive a UL channel which is sent by the terminal device through one of the M beams.

Accordingly, the network device configures a plurality of candidate beams, which are configured to send the UL channel, for the terminal device, and the terminal device performs carrier sensing on the plurality of candidate beams in sequence and selects a proper beam based on a sensing result to send the UL channel, so that a transmission delay of the UL channel on an unlicensed frequency band may be greatly reduced.

Optionally, the beam information is an index of SRS resources.

Optionally, the UL channel is a PUSCH or a PUCCH.

Optionally, the transceiver unit 710 is specifically configured to receive the UL channel which is sent by the terminal device through an Nth beam of the M beams, the Nth beam being a beam on which the terminal device senses that a channel is idle when performing carrier sensing on the M beams in sequence, and N being a positive integer less than or equal to M.

Optionally, N beams which include the Nth beam and on which carrier sensing is performed correspond to N sensing windows one to one, and a sensing window used by the terminal device to perform carrier sensing on each beam of the N beams is the sensing window corresponding to the beam.

Optionally, the N sensing windows are N successive sensing windows.

Optionally, the transceiver unit 710 is further configured to send first indication information to the terminal device, the first indication information being configured to indicate information of each sensing window.

Optionally, the information of each sensing window includes a time length of the sensing window and/or a starting time position of the sensing window.

Optionally, the UL channel is the PUSCH, and the first signaling further includes information of a first time length, the first time length being a time length between a slot, a starting time-domain symbol or an ending time-domain symbol where a PDCCH sent to the terminal device by the network device is located and a starting time point of a first sensing window, and the first sensing window being a sensing window which corresponds to a beam sensed firstly of the N beams.

Optionally, the UL channel is the PUSCH, and the first signaling further includes information of a second time length, the second time length being a time length between a slot or an ending time-domain symbol where the PUSCH sent to the network device by the terminal device is located and a slot or a starting time-domain symbol where a downlink feedback channel is located, and the downlink feedback channel being configured for the terminal device to send feedback response information for the PUSCH to the network device.

Optionally, the transceiver unit 710 is specifically configured to receive the UL channel sent by the terminal device through a beam, on which a channel is sensed to be idle, of the M beams, the terminal device simultaneously performing carrier sensing on the M beams.

Optionally, the transceiver unit 710 is further configured to send second indication information to the terminal device, the second indication information being configured to indicate a value of M.

It is to be understood that the network device 700 may execute corresponding operations executed by the network device in the method 200 and, for simplicity, will not be elaborated herein.

Figure 8:
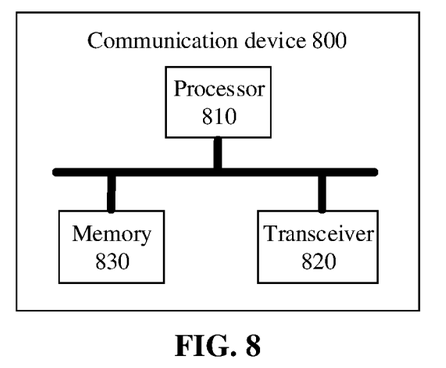
FIG. 8 is a schematic structure diagram of a communication device according to an embodiment of the disclosure.

FIG. 8 is a schematic structure diagram of a communication device 800 according to an embodiment of the disclosure. As illustrated in FIG. 8, the communication device includes a processor 810, a transceiver 820 and a memory 830. Herein, the processor 810, the transceiver 820 and the memory 830 communicate with one another through an internal connection path. The memory 830 is configured to store instructions, and the processor 810 is configured to execute the instructions stored in the memory 830 to control the transceiver 820 to receive a signal or send a signal.

Optionally, the processor 810 may call the program code stored in the memory 830 to execute corresponding operations, executed by a terminal device, in the method 200. For similarity, no more elaborations will be made herein.

Optionally, the processor 810 may call the program code stored in the memory 830 to execute corresponding operations, executed by a network device, in the method 300. For similarity, no more elaborations will be made herein.

It is to be understood that the processor in the embodiment of the disclosure may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device, discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 9:
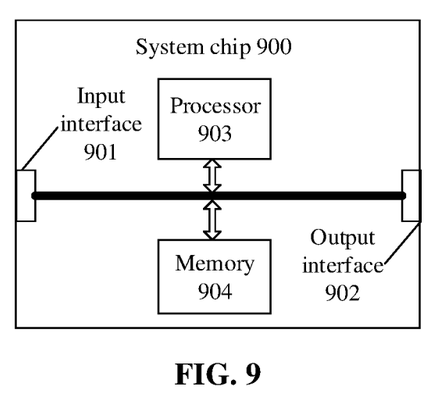
FIG. 9 is a schematic structure diagram of a system chip according to an embodiment of the disclosure.

FIG. 9 is a schematic structure diagram of a system chip according to an embodiment of the disclosure. The system chip 900 of FIG. 9 includes an input interface 901, an output interface 902, at least one processor 903 and a memory 904. The input interface 901, the output interface 902, the processor 903 and the memory 904 are connected with one another through an internal connection path. The processor 903 is configured to execute a code in the memory 904.

Optionally, when the code is executed, the processor 903 may implement corresponding operations executed by a terminal device in the method 200. For simplicity, elaborations are omitted herein.

Optionally, when the code is executed, the processor 903 may implement corresponding operations executed by a network device in the method 200. For simplicity, elaborations are omitted herein.

It is to be understood that, in the embodiments of disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, a plurality of units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to a plurality of network units. Part or all of the units may be selected to achieve the purpose of the solutions of the embodiments according to a practical requirement.

In addition, each functional unit in each embodiment of the disclosure may be integrated into a monitoring unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for scheduling Uplink (UL) data, comprising:
receiving, by a terminal device, first signaling sent by a network device, the first signaling comprising beam information of M beams, M being a positive integer greater than 1;
performing, by the terminal device, carrier sensing on the M beams in sequence according to the first signaling until it is sensed on an Nth beam that a channel is idle, N being a positive integer less than or equal to M; and
sending, by the terminal device, a UL channel to the network device through the Nth beam,
wherein performing, by the terminal device, carrier sensing on the M beams in sequence according to the first signaling comprises:
performing, by the terminal device, according to priorities of the M beams, carrier sensing on the M beams one by one in a sequence from high to low priorities,
wherein a plurality of beams on which carrier sensing is performed have one-to-one successive sensing windows, and a sensing window used by the terminal device to perform carrier sensing on each beam of the plurality of beams on which carrier sensing is performed is the sensing window corresponding to the beam; and wherein the UL channel is a Physical Uplink Shared Channel (PUSCH), and the first signaling further comprises information of a first time length, the first time length being a time length between a slot, a starting time-domain symbol or an ending time-domain symbol where a Physical Downlink Control Channel (PDCCH) sent to the terminal device by the network device is located and a starting time point of a first sensing window, and the first sensing window being a sensing window which corresponds to a beam sensed firstly.

2. The method of claim 1, wherein the beam information is an index of Sounding Reference Signal (SRS) resources.

3. The method of claim 1, before performing, by the terminal device, carrier sensing on the M beams one by one, further comprising:
receiving, by the terminal device, first indication information sent by the network device, the first indication information being configured to indicate information of each sensing window; or
acquiring, by the terminal device, the information, pre-stored in the terminal device, of each sensing window;
wherein the information of each sensing window comprises a time length of the sensing window and/or a starting time position of the sensing window.

4. The method of claim 1, wherein the UL channel is the PUSCH, and the first signaling further comprises information of a second time length, the second time length being a time length between a slot or a location of an ending time-domain symbol where the PUSCH is sent to the network device by the terminal device and a slot or a starting time-domain symbol where a downlink feedback channel is located, and the downlink feedback channel being configured for the network device to send feedback response information for the PUSCH to the terminal device.

5. A method for scheduling Uplink (UL) data, comprising:
sending, by a network device, first signaling to a terminal device, the first signaling comprising beam information of M beams, M being a positive integer greater than 1; and
receiving, by the network device, a UL channel which is sent by the terminal device through an Nth beam of the M beams, the Nth beam being a beam on which the terminal device senses that a channel is idle when performing carrier sensing on the M beams in sequence, and N being a positive integer less than or equal to M,
wherein a plurality of beams on which carrier sensing is performed have one-to-one successive sensing windows, and a sensing window used by the terminal device to perform carrier sensing on each beam of the plurality of beams on which carrier sensing is performed is the sensing window corresponding to the beam; and
wherein the UL channel is a Physical Uplink Shared Channel (PUSCH), and the first signaling further comprises information of a first time length, the first time length being a time length between a slot, a starting time-domain symbol or an ending time-domain symbol where a Physical Downlink Control Channel (PDCCH) sent to the terminal device by the network device is located and a starting time point of a first sensing window, and the first sensing window being a sensing window which corresponds to a beam sensed firstly.

6. The method of claim 5, before the network device sends the first signaling to the terminal device, further comprising:

sending, by the network device, second indication information to the terminal device, the second indication information being configured to indicate a value of M.

7. A terminal device, comprising a processor, a transceiver and a memory, wherein
the memory is configured to store instructions capable of running on the processor;
the transceiver is configured to receive first signaling sent by a network device, the first signaling comprising beam information of M beams, M being a positive integer greater than 1; and
the processor is configured to perform carrier sensing on the M beams in sequence according to the first signaling until it is sensed on an Nth beam that a channel is idle, N being a positive integer less than or equal to M, and wherein
the transceiver is further configured to send a UL channel to the network device through the Nth beam,
wherein the processor is specifically configured to:
perform, according to priorities of the M beams, carrier sensing on the M beams one by one in a sequence from high to low priorities,
wherein a plurality of beams and on which carrier sensing is performed have one-to-one successive sensing windows, and a sensing window used by the terminal device to perform carrier sensing on each beam of the plurality of beams on which carrier sensing is performed is the sensing window corresponding to the beam; and
wherein the UL channel is a Physical Uplink Shared Channel (PUSCH), and the first signaling further comprises information of a first time length, the first time length being a time length between a slot, a starting time-domain symbol or an ending time-domain symbol where a Physical Downlink Control Channel (PDCCH) sent to the terminal device by the network device is located and a starting time point of a first sensing window, and the first sensing window being a sensing window which corresponds to a beam sensed firstly.

8. The terminal device of claim 7, wherein the beam information is an index of Sounding Reference Signal (SRS) resources.

9. The terminal device of claim 7, wherein the processor is further configured to:
receive first indication information sent by the network device through the transceiver unit, the first indication information being configured to indicate information of each sensing window; or
acquire the information, pre-stored in the terminal device, of each sensing window;
wherein the information of each sensing window comprises a time length of the sensing window and/or a starting time position of the sensing window.

10. The terminal device of claim 7, wherein the UL channel is the PUSCH, and the first signaling further comprises information of a second time length,
the second time length being a time length between a slot or a location of an ending time-domain symbol where the PUSCH is sent to the network device by the terminal device and a slot or a starting time-domain symbol where a downlink feedback channel is located, and the downlink feedback channel being configured for the network device to send feedback response information for the PUSCH to the terminal device.

11. A network device, comprising a processor, a transceiver and a memory, wherein the memory is configured to store instructions capable of running on the processor;

the transceiver is configured to send first signaling to a terminal device, the first signaling comprising beam information of M beams, M being a positive integer greater than 1, and wherein the transceiver is further configured to receive an Uplink (UL) channel which is sent by the terminal device through an Nth beam of the M beams, the Nth beam being a beam on which the terminal device senses that a channel is idle when performing carrier sensing on the M beams in sequence, and N being a positive integer less than or equal to M, wherein a plurality of beams on which carrier sensing is performed have one-to-one successive sensing windows, and a sensing window used by the terminal device to perform carrier sensing on each beam of the plurality of beams on which carrier sensing is performed is the sensing window corresponding to the beam; and wherein the UL channel is a Physical Uplink Shared Channel (PUSCH), and the first signaling further comprises information of a first time length, the first time length being a time length between a slot, a starting time-domain symbol or an ending time-domain symbol where a Physical Downlink Control Channel (PDCCH) sent to the terminal device by the network device is located and a starting time point of a first sensing window, and the first sensing window being a sensing window which corresponds to a beam sensed firstly.

* * * * *